US010042732B2

(12) United States Patent
Wu et al.

(10) Patent No.: US 10,042,732 B2
(45) Date of Patent: Aug. 7, 2018

(54) DYNAMIC DATA COLLECTION PATTERN FOR TARGET DEVICE

(71) Applicant: MICROSOFT TECHNOLOGY LICENSING, LLC, Redmond, WA (US)

(72) Inventors: Yi-Lei Wu, Redmond, WA (US); Matthew Koscumb, Seattle, WA (US); Scott McMurray, Redmond, WA (US); Molly Grossman, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 167 days.

(21) Appl. No.: 14/828,222

(22) Filed: Aug. 17, 2015

(65) Prior Publication Data
US 2017/0052831 A1 Feb. 23, 2017

(51) Int. Cl.
| G06F 3/00 | (2006.01) |
| G06F 9/44 | (2018.01) |
| G06F 9/46 | (2006.01) |
| G06F 13/00 | (2006.01) |
| G06F 11/34 | (2006.01) |
| G06F 9/50 | (2006.01) |

(52) U.S. Cl.
CPC ............ *G06F 11/34* (2013.01); *G06F 9/5083* (2013.01)

(58) Field of Classification Search
None
See application file for complete search history.

(56) References Cited

U.S. PATENT DOCUMENTS

| 7,290,048 B1 | 10/2007 | Barnett et al. |
| 8,601,155 B2 | 12/2013 | Toombs et al. |
| 8,838,801 B2 | 9/2014 | Alapati et al. |
| 2002/0152305 A1 | 10/2002 | Jackson et al. |
| 2006/0206698 A1 | 9/2006 | Foucher et al. |

(Continued)

OTHER PUBLICATIONS

Rabinowitz, et al.,"Collecting and Analyzing Data", Published on: Oct. 20, 2013 Available at: http://ctb.ku.edu/en/table-of-contents/evaluate/evaluate-community-interventions/collect-analyze-data/main.

(Continued)

*Primary Examiner* — Tuan Dao
*Assistant Examiner* — William C Wood
(74) *Attorney, Agent, or Firm* — Liang IP, PLLC

(57) ABSTRACT

A telemetry module integrated with an application may include a data collection and analysis engine configured to implement a data collection pattern comprised of data collection rules to perform data collection and analysis for reporting to a service associated with the application. The telemetry module may also include a scaling profile manager configured to dynamically scale the data collection and analysis performed by the data collection and analysis engine for a target device such that parameters of the data collection and analysis correspond to resources and capabilities of the target device. After scaling, the data collection and analysis engine may then be further configured to determine additional data collection rules based on the scaled data collection and analysis, and dynamically modify the data collection pattern implemented based on the additional data collection rules such that the data collection pattern also corresponds to resources and capabilities of the target device.

20 Claims, 6 Drawing Sheets

(56) References Cited

U.S. PATENT DOCUMENTS

| | | | |
|---|---|---|---|
| 2007/0076728 A1 | 4/2007 | Rieger et al. | |
| 2008/0091489 A1* | 4/2008 | LaRock | G06Q 30/02 705/7.32 |
| 2009/0089325 A1 | 4/2009 | Bradford et al. | |
| 2009/0182605 A1 | 7/2009 | Lappas et al. | |
| 2009/0216706 A1* | 8/2009 | Dai | G06F 3/1423 706/54 |
| 2009/0271792 A1* | 10/2009 | Mills | G06F 9/542 718/103 |
| 2012/0204267 A1 | 8/2012 | Prafullchandra et al. | |
| 2012/0239739 A1 | 9/2012 | Manglik et al. | |
| 2013/0238785 A1 | 9/2013 | Hawk et al. | |
| 2014/0148102 A1* | 5/2014 | Hoffman | H04W 24/10 455/67.11 |
| 2014/0335491 A1 | 11/2014 | Behrmann et al. | |
| 2015/0019234 A1 | 1/2015 | Cooper et al. | |
| 2015/0046512 A1 | 2/2015 | Ashby et al. | |
| 2015/0081885 A1* | 3/2015 | Thomas | G06F 9/45558 709/224 |
| 2015/0154170 A1 | 6/2015 | Ren | |
| 2015/0378786 A1* | 12/2015 | Suparna | G06F 9/5011 718/104 |
| 2016/0094395 A1* | 3/2016 | Hu | H04W 28/16 370/254 |

OTHER PUBLICATIONS

"Collecting Telemetry Data from Your Apps", Published on: Oct. 10, 2013 Available at: http://msdn.microsoft.com/en-us/library/windows/apps/hh967787.aspx.

Iosup, Alexandru, "CAMEO: Continuous Analytics for Massively Multiplayer Online Games on Cloud Resources", In Proceedings of 15th International Euro-Par Conference, Aug. 25, 2009, 10 pages.

"Corrected Notice of Allowance Issued in U.S. Appl. No. 14/831,286", dated Nov. 18, 2016, 2 Pages.

"Non Final Office Action Issued in U.S. Appl. No. 14/831,286", dated Jul. 11, 2016, 8 Pages.

"Notice of Allowance Issued in U.S. Appl. No. 14/831,286", dated Oct. 21, 2016, 7 Pages.

"Notice of Allowance Issued in U.S. Appl. No. 15/435,516", dated Jan. 11, 2018, 7 Pages.

* cited by examiner

DYNAMIC DATA COLLECTION PATTERN FOR TARGET DEVICE

BACKGROUND

A data collection and analysis engine built into an application installed on a client device may be employed to collect, analyze, and report application data desired from the client device to a service provider associated with the application. However, in conventional systems, data collection performed by the data collection and analysis engine may be constrained by one or more rules defined by a developer to collect an event in a static manner. Often, out of concern for data volume the event may generate, as well as device resources that the data collection and analysis engine may consume, the developer may design the rules to fit a lowest-end device resource profile in order to avoid performance issues on low-end devices.

As such, the developer may have to design many different rules for collecting a same event in order to fit resource profiles for a multitude of device types, and with the sheer number of devices employed throughout the world, the time and cost to design data collection rules for various events for each device type would be excessive. Accordingly, methods for data collection could use improvements such that implementation of dynamically variable data collection patterns may be enabled, where the data collections patterns correspond to resources for a particular, target device.

SUMMARY

This summary is provided to introduce a selection of concepts in a simplified form that are further described below in the Detailed Description, This summary is not intended to exclusively identify key features or essential features of the claimed subject matter, nor is it intended as an aid in determining the scope of the claimed subject matter.

Embodiments are directed to dynamic modification of a data collection pattern for a target device. A data collection pattern comprised of one or more data collection rules to be implemented by a data collection and analysis engine for data collection and analysis may be received from a service associated with an application being executed on the device, and a profile for the device that defines criteria for scaling of the data collection and analysis may also be received from the service. One or more resources and capabilities of the device may be determined, the resources and capabilities of the device may be compared to the criteria, and the data collection and analysis may be scaled based on the comparison. The data collection pattern implemented by the data collection and analysis engine may then be dynamically modified based on the scaled data collection and analysis.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
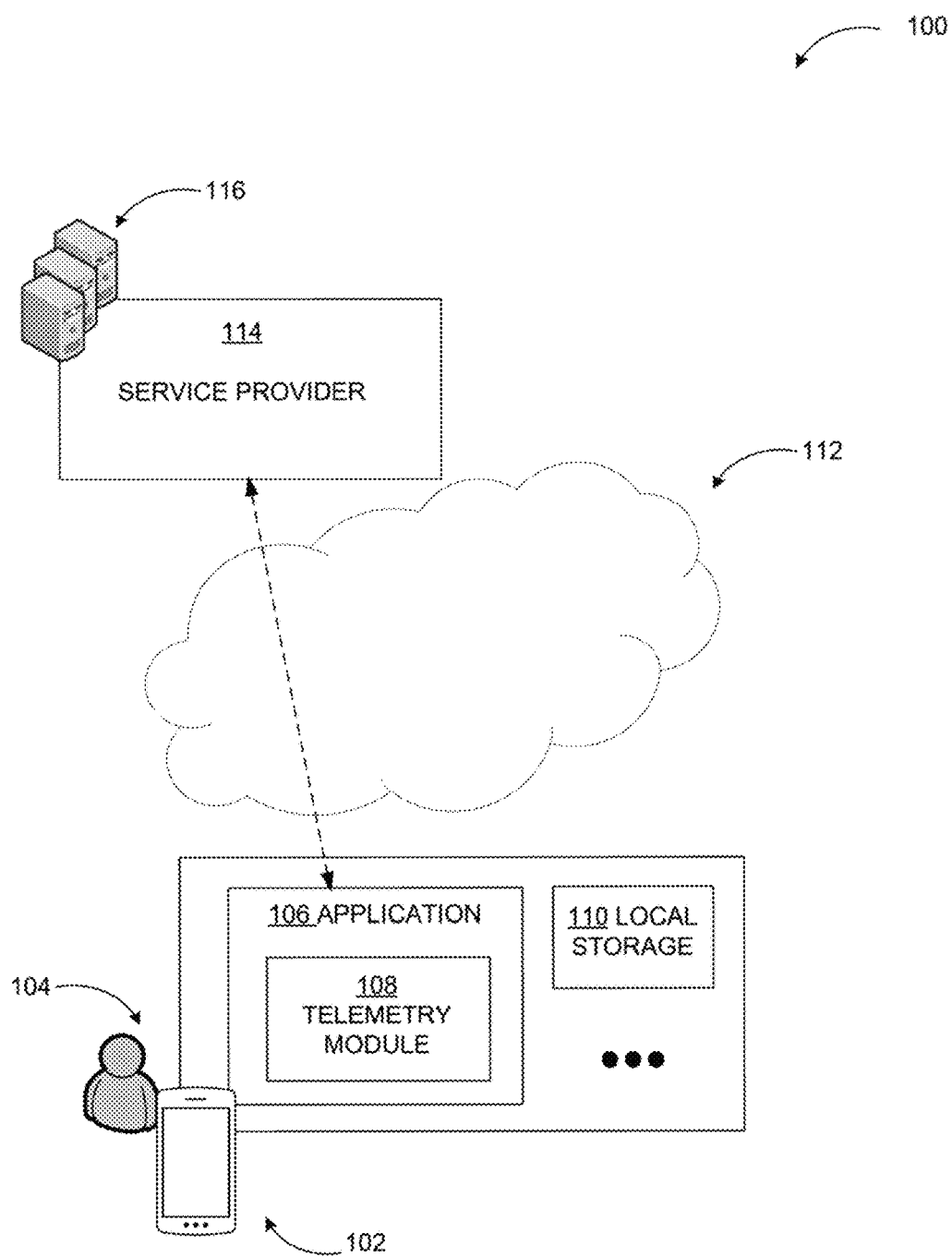
FIG. 1 includes an example network environment where a system for dynamic modification of a data collection pattern for a target device may be implemented.

As briefly described above, a telemetry module integrated with an application may include a data collection and analysis engine configured to perform data collection and analysis for reporting to a service associated with the application. The data collection and analysis performed may be based on a data collection pattern comprised of one or more data collection rules provided by the service. The telemetry module may also include various specialized components configured to dynamically scale data collection and analysis performed by the data collection and analysis engine for a target device. For example, a scaling profile manager may be configured to receive a profile for a device on which the application is being executed from the service, where the profile may define criteria for the scaling of the data collection and analysis. The scaling profile manager may be further configured to determine one or more resources and capabilities of the device, compare the determined resources and capabilities to the criteria of the profile, and scale the data collection and analysis to be performed by the data collection and analysis engine based on the comparison. Scaling may include adjusting parameters of the data collection and analysis such that the parameters correspond to the resources and capabilities of the device. After scaling, the data collection and analysis engine may be configured to determine one or more additional data collection rules based on the scaled data collection and analysis, and dynamically modify the data collection pattern based on the additional data collection rules such that the modified data collection pattern also corresponds to the resources and capabilities of the device.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a. computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for dynamic modification of a data collection pattern for a target device. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 includes an example network environment where a system for dynamic modification of a data collection pattern for a target device may be implemented. As illustrated in diagram 100, a user 104 may execute a thick (e.g., a locally installed client application) version of an application 106 through a device 102. The device 102 may include a desktop computer, a laptop computer, a tablet computer, a vehicle mount computer, a smart phone, or a wearable computing device, among other similar devices. A service provider 114, such as a software provider, hosted by one or more servers 116 may be associated with the application 106 that is being executed on the device 102. The service provider 114 may desire to monitor and collect data associated with an activity, a performance, and/or a state of the application 106, as it is being executed on the device 102.

In some embodiments, the service provider 114 may monitor and collect data associated with a same application across multiple devices associated with many different users in order to detect, diagnose, and fix issues associated with the application 106. However, because the service provider 114 may be remote, it may be difficult to monitor, retrieve and store a large amount of raw application data from the multiple devices over the network 112. Additionally, exchanging large amounts of raw application data from the multiple devices over the network 112 may be inefficient, consuming valuable network and server resources. Furthermore, in order to address problems or issues associated with the application 106, the service provider 114 may need to deploy separate tools over the network 112 to the multiple devices executing the application 106. Direct access and manual interaction with the client device may also be required in order to detect, diagnose, and repair application issues, which can be inconvenient and inefficient as the service provider 114 may monitor a large number of applications distributed across many locations.

To overcome these inefficiencies, the service provider 114 may provide a telemetry module 108 in order to perform data retrieval and analysis of the application 106 as it is being executed at the device 102. The telemetry module 108 may be integrated with the application 106 such that the telemetry module 108 may not require separate installation and execution, but may be configured to continuously monitor data as the application 106 is executed, and provide the data to the service provider 114 remotely over a network 112, such as a cloud based network. For example, the telemetry module 108 may be configured to collect data requested by the service provider 114, analyze the data, and provide data analysis to the service provider 114 over the network 112. Content, such as the data collected by the telemetry module 108, may be stored locally at local storage 110 of the device 102 and/or remotely at data stores managed by the service provider 114, or by third party services. After receiving the data analysis, the service provider 114 may efficiently implement processes to address issues with the application 106 detected in the data analysis report, such as providing a patch to fix an application problem over the network 112 to the application 106.

According to some embodiments, the telemetry module 108 may include one or more components to facilitate data collection and analysis for reporting to the service provider 114 Example components may include a data collection and analysis engine comprised of a data collector and a rule manager and analyzer, and a telemetry transport component, where the components may be implemented as software, hardware, or combinations thereof. For example, the telemetry module 108 may receive instructions, which may be a data collection pattern comprised of one or more data collection rules, from the service provider 114 through the telemetry transport component. The data collection rules may indicate one or more types of data to be collected, types of operations to be performed on data to be collected, an amount of data to be collected, a time at which the data is to be collected, a frequency at which the data is to be collected, and/or operating conditions of the device 102 under which the data is to be collected, for example. The data collection and analysis engine may collect and analyze data of the application 106 according to the data collection pattern. The data analysis may then be provided to the service provider 114 over the network 112 through the telemetry transport component. In some examples, the data collection rules may also indicate a time, a frequency, and/or operating conditions of the device 102 under which the data analysis is to be provided to the service provider 114.

According to other embodiments, the telemetry module 108 may include one or more additional components configured to facilitate a dynamic scaling of the data collection and analysis to be performed by the data collection and analysis engine for a target device. The target device may be the device 102 on which the application 106 is being executed, for example. The additional components may include a scaling profile manager, and one or more dynamic resource allocators associated with the data collection and analysis engine, where the components may be implemented as software, hardware, or combinations thereof For example, the scaling profile manager may be configured to receive a profile for the device 102 from the service provider 114. The profile may define criteria for a scaling of the data collection and analysis to be performed by the data collection and analysis engine. The scaling profile manager may be configured to determine one or more resources and capabilities of the device 102, compare the resources and capabilities of the device 102 to the criteria, and scale the data collection and analysis based on the comparison. Scaling may include adjusting parameters of the data collection and analysis such that the parameters of may correspond to the resources and capabilities of the device 102. For example, scaling of the data collection and analysis may include allocating additional resources and capabilities of the device 102 to the data collection and analysis engine or de-allocating at least one of the resources and capabilities of the device 102 from the data collection and analysis engine. Scaling of the data collection and analysis may also include enabling or disabling features of the data collection and analysis engine, and/or adjusting one or more software limits of the data collection and analysis engine.

According to further embodiments, the data collection and analysis engine may be configured to determine one or more additional data collection rules based on the scaled data collection and analysis. The additional data collection rules may indicate additional types of data to be collected, removal of the types of data to be collected, aggregation, mathematical and/or filtering operations to be performed on data to be collected, an increase or a decrease in the amount of data to be collected, an alternate time at which the data is to be collected, an increase or a decrease of the frequency at which the data is to be collected, and alternate operating conditions of the computing device under which the data is to be collected. For example, if one or more resources have been de-allocated from the data collection and analysis engine causing one or more features of the data collection engine to be disabled, the additional rules may limit an amount of data to be collected by the data collection and analysis engine. The data collection and analysis engine may dynamically modify the data collection pattern received from the service provider 114 based on the additional data collection rules determined. The data collection and analysis engine may then be configured to implement the modified data collection pattern to perform data collection. In some examples, the additional data collection rules may also indicate an alternate time, frequency, and/or operating conditions of the device 102 under which the data analysis is to be provided to the service provider 114.

As discussed above, the data collection and analysis engine integrated with the application 106 may be employed to collect, analyze, and report application data from the device 102 to the service provider 114 associated with the application 106 over the network 112 such that the service provider 114 may detect, diagnose, and fix problems with the application 106 based on the reported application data. Dynamic modification of a data collection pattern, as described herein, may enable the data collection and analysis engine to collect the application data based on data collection rules corresponding to resources that are available to the data collection and analysis engine. Furthermore, as the data collection rules are determined based on a scaling of data collection and analysis for a particular, target device on which the application is being executed, such as the device 102, the data collection and analysis engine may be enabled to collect the application data based on data collection rules further corresponding to resources that are available for the particular, target device. As a result, dynamic modification of the data collection pattern may enable optimized performance of data collection without negatively impacting other operations executed by the target device by controlling what types of data to collect, types of operations to be performed on data to be collected, how much data to collect, and how often to collect the data, for example. The dynamic modification of the data collection pattern may en able reduced processor load (and consequently increased processing speed), conservation of memory, and reduced network bandwidth usage, among other features, that may improve the efficiency and performance of the target device.

Embodiments, as described herein, address a need that arises from very large scale of operations created by software-based services that cannot be managed by humans. The actions/operations described herein are not a mere use of a computer, but address results of a system that is a direct consequence of software used as a service offered in conjunction with large numbers of users and applications.

Figure 2:
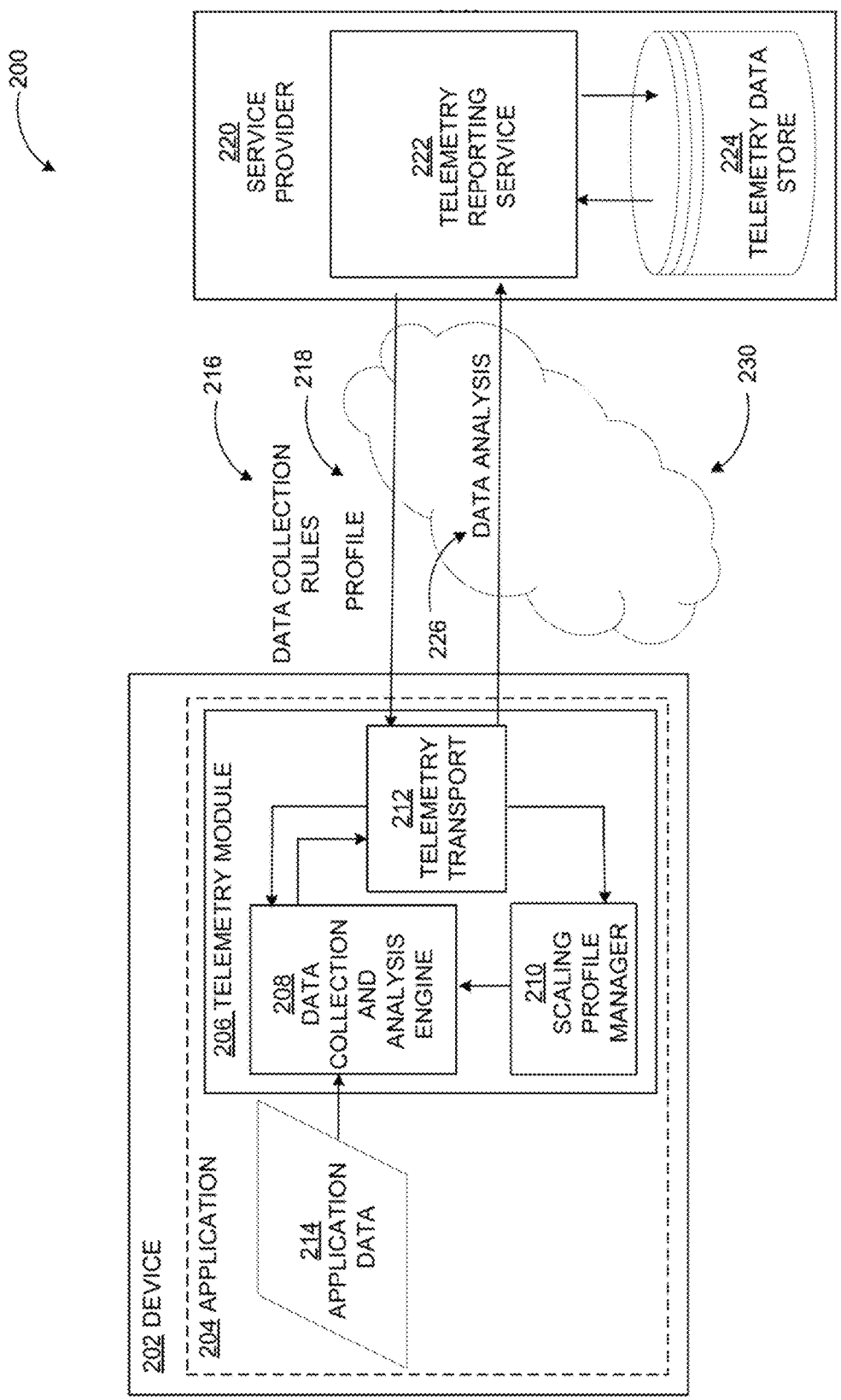
FIG. 2 includes a conceptual diagram illustrating a system for dynamic modification of a data collection pattern for a target device.

FIG. 2 includes a conceptual diagram illustrating a system for dynamic modification of data collection patterns for a target device. Diagram 200 illustrates a telemetry module 206 that may be integrated with an application 204 executed on a device 202.

The telemetry module 206 may include a data collection and analysis engine 208 configured to perform data collection and analysis for reporting to a service provider 220 associated with the application 204. Data including log data, event data, performance data, and state data associated with the application 204, may be collected based on a data collection pattern comprised of one or more data collection rules 216 provided by the service provider 220. The telemetry module 206 may also include a scaling profile manager 210 configured to dynamically scale the data collection and analysis performed by the data collection and analysis engine 208 for a target device, such as the device 202 on which the application 204 is being executed. The data collection and analysis may be scaled such that parameters of the data collection and analysis correspond to resources and capabilities of the target device, for example. The data collection and analysis engine 208 may be fluffier configured to determine one or more additional data collection rules based on the scaled data collection and analysis, and dynamically modify the data collection pattern based on the one or more additional data collection rules such that the data collection pattern also corresponds to the resources and capabilities of the target device. The telemetry module 206 may further include a telemetry transport component 212 configured to communicate periodically with the service provider 220 over one or more networks, such as a cloud-based network 230.

In an example embodiment, the telemetry module 206 may receive the data collection pattern comprised of the data collection rules 216 from the service provider 220 through the telemetry transport component 212. The data collection rules 216 may indicate one or more types of data to be collected, types of operations to be performed on data to be collected, an amount of data to be collected, a time at which the data is to be collected, a frequency at which the data is to be collected, and/or operating conditions of the device 202 under which the data is to be collected, for example. The telemetry transport component 212 may provide the data collection rules 216 to the data collection and analysis engine 208. The data collection and analysis engine 208 may include two separate components, a data collector and a rule manager and analyzer. The data collector may filter through application data 214 to collect data as specified by the data collection rules 216, and the rule manager and analyzer may perform an analysis of the filtered application data 214. The telemetry module 108 may provide the data analysis 226 from the rule manager and analyzer to a telemetry reporting service 222 of the service provider 220 over the network 230 through the telemetry transport component 212. In some embodiments, the rule manager and analyze may generate a report based on the data analysis 226 to be provided to the telemetry reporting service 222. The telemetry reporting service 222 may store the received data analysis 226 and/or report in an associated telemetry data store 224, where data analysis and/or reports from multiple distributed applications and devices may be stored and managed.

In further embodiments, the service provider 220 may define target features of devices for which a profile 218 is to be activated or deactivated, where the device 202 may comprise the defined target features enabling the profile 218 to be activated. The telemetry module 206 may receive the profile 218 from the service provider 220 through the telemetry transport component 212, and the telemetry transport component 212 may provide the profile 218 to the scaling profile manager 210. The profile 218 may define criteria for a scaling of data collection and analysis performed by the data collection and analysis engine 208. The criteria may include one or more triggers associated with resource events of the device 202, software events of the device 202, and/or user actions associated with the device 202. The criteria may also include a response associated with the triggers.

The scaling profile manager 210 may be configured to determine one or more resources and capabilities of the device 202, where the determined resources and capabilities of the device may include resources and capabilities associated with the triggers of the criteria. The scaling profile manager 210 may be configured to compare the resources and capabilities of the device 202 to the criteria to determine whether the determined resources and capabilities of the device 202 correspond to the triggers of the criteria for the scaling of the data collection and analysis. In response to a determination that the determined resources and capabilities of the device correspond to the triggers, the scaling profile manager 210 may scale the data collection and analysis based on the response associated with the triggers defined within the criteria. Scaling of the data collection and analysis based on the response may include adjusting parameters of the data collection and analysis such that the parameters correspond to the resources and capabilities of the device 202. For example, scaling may include allocating additional resources and capabilities of the device 202 to the data collection and analysis engine 208 or de-allocating at least one of the resources and capabilities of the device 202 from the data collection and analysis engine 208. Scaling of the data collection and analysis based on the response may also include enabling or disabling features of the data collection and analysis engine 208. For example, the features or capabilities of the data collection and analysis engine 208 may be enabled or disabled in response to the allocation or de-allocation of the resources of the device 202. Scaling of the data collection and analysis may further include adjusting one or more software limits of the data collection and analysis engine 208, where the software limits include a data grouping limit, an event queue size, and/or a data upload size.

The rule manager and analyzer of the data collection and analysis engine 208 may be configured to determine one or more additional data collection rules based on the scaled data collection and analysis. The additional data collection rules may indicate additional types of data to be collected, removal of the types of data to be collected, aggregation, mathematical, and/or filtering operations to be performed on data to be collected, an increase or a decrease of the amount of data to be collected, an alternate time at which the data is to be collected, an increase or a decrease in the frequency at which the data is to be collected, and/or alternate operating conditions of the device 202 under which the data is to be collected, for example. The rule manager and analyzer may dynamically modify the data collection pattern received from the service provider 220 based on the additional data collection rules determined, and provide the modified data collection pattern to the data collector of the data collection and analysis engine 208. The data collector may then be configured to perform data collection implementing the modified data collection pattern.

In an example scenario, the device 202 executing the application 204 may be a laptop computer that is operating under an un-metered wireless local area network (WLAN). The data collection pattern comprised of the data collection rules 216 from the service provider 220 may specify to collect usage information user information, and metadata associated with the device 202. A user of the device 202 may move the device 202 to another location (for example, from home to work), and the device 202 may now be operating under a metered WLAN, where the metered WLAN may limit the amount of data enabled to be sent and received by the device 202, for example. The change in available network may be detected as a resource event of the device 202, and the change in the available network to a metered network may be a trigger of the criteria defined by the profile 218 for the device 202. Accordingly, the scaling profile manager 210 may scale the data collection and analysis based on the response associated with the trigger defined within the criteria. For example, the response associated with a metered network trigger may be to de-allocate at least one of the resources and capabilities of the device 202 from the data collection and analysis engine 208. By de-allocating resources and/or capabilities flout the data collection and analysis engine 208, less data may be collected and processed by the data collection and analysis engine 208 to appropriately correspond to the limits on data imposed by the metered network.

Following de-allocation, the data collection and analysis engine 208 may then be configured to determine one or more additional data collection rules based on the de-allocation. For example, the additional data collection rule may specify to only collect metadata associated with the device 202 as the amount of data that may he collected is limited, and the metadata associated with the device 202 is more important for analysis than usage and/or user information. Accordingly, the data collection and analysis engine 208 may dynamically modify the data collection pattern provided by the service provider 220 with the additional data collection rule. The data collection and analysis engine 208 may then be configured to perform data collection based on the modified data collection pattern such that only metadata associated with the device 202 is collected to correspond to resources available to the collection and analysis engine 208 and ultimately the device 202.

Figure 3:
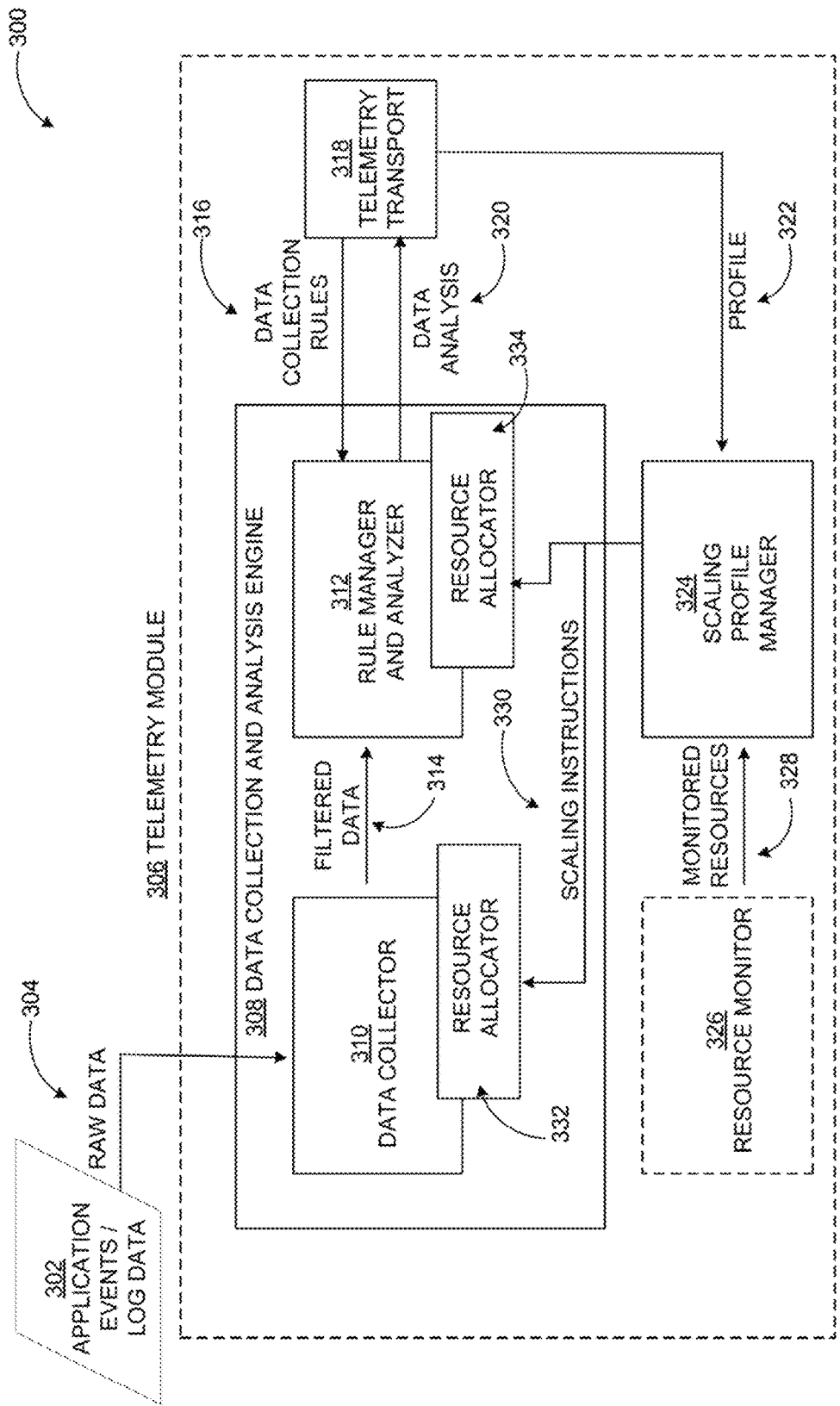
FIG. 3 illustrates an example configuration of a telemetry module.

FIG. 3 illustrates an example configuration of a telemetry module. As illustrated in diagram 300, a telemetry module 306 may comprise various components to facilitate dynamic modification of a data collection pattern. The telemetry module 306 may be integrated with an application installed on one or more devices, such that the telemetry module 306 may be configured to continuously collect and analyze data associated with the application as the application is being executed on the devices. The telemetry module 306 may provide and/or report the collected and analyzed data to a service provider associated with the application. Upon receipt of the collected and analyzed data, the service provider may efficiently implement processes to address issues with the application detected in the collected and analyzed data.

According to some embodiments, the telemetry module 306 may include a data collection and analysis engine 308 configured to perform data collection and analysis for reporting to the service provider. The data collection and analysis engine 308 may include one or more separate components, such as a data collector 310 and a rule manager and analyzer 312, for example. The telemetry module 306 may also include a telemetry transport component 318 configured to communicate with the service provider. For example, the telemetry transport component 318 may receive a data collection pattern comprised of a set of data collection rules 316 from the service provider, and provide the set of data collection rules 316 to the rule manager and analyzer 312 of the data collection and analysis engine 308.

The rule manager and analyzer 312 may be configured to process the set of data collection rules 316. The data collection rules 316 may indicate one or more types of data to be collected, types of operations to be performed on data to be collected, an amount of data to be collected, a time at which the data is to be collected, a frequency at which the data is to be collected, and/or operating conditions of the device 202 under which the data is to be collected, for example. The rule manager and analyzer 312 may then communicate instructions for data collection based on the processed set of data collection rules 316 to the data collector 310 of the data collection and analysis engine 308. The data collector 310 may collect and pre-filter raw data 304, such as event and logging data 302, from the application based on the instructions communicated by the rule manager and analyzer 312. The rule manager and analyzer 312 may receive the pre-filtered data 314 from the data collector 310, and may apply logic to perform additional filtering and data analysis. The rule manager and analyzer 312 may provide the collected and analyzed data 320 to the telemetry transport component 318 for reporting to the service provider.

According to other embodiments, the telemetry module 306 may include a scaling profile manager 324 that may be configured to dynamically scale the data collection and analysis to be performed by the data collection and analysis engine 308. The scaling profile manager 324 may receive a profile 322 for a device on which the application is being executed from the telemetry transport component 318. The telemetry transport component 318 may receive the profile 322 from a service, such as a software provider, that is associated with the application. The profile 322 may include criteria for a sealing of the data collection and analysis performed by the data collection and analysis engine 308. The criteria may include one or more triggers, and a response associated with the triggers. The triggers may be associated with resource events of the device, software events of the device, and/or user actions associated with the device. The resource events may include a computer processing unit (CPU) load percentage, an available memory, an available network, an available disk space, an available network bandwidth, and/or an available battery percentage, for example. The software events may include crashes, errors, warnings, and/or updated data collection patterns, for example. The response may include allocating or de-allocating resources and/or capabilities of the device to or from the data collection and analysis engine 308, enabling or disabling features of the data collection and analysis engine 308 and/or adjusting software limits of the data collection and analysis engine 308.

The scaling profile manager 324 may determine one or more resources and capabilities of the device based on a time and a frequency defined by the profile 322. In other embodiments, a resource monitor 326 may monitor the resources and capabilities of the device in real-time, and provide the monitored resources and capabilities 328 of the device to the scaling profile, manager 324. The determined resources and capabilities of the device may include resources and capabilities associated with the triggers of the criteria, such as a CPU load percentage, an available memory, an available network, an available disk space, an available network bandwidth, and/or an available battery percentage, for example.

The scaling profile manager 324 may be configured to compare the resources and capabilities of the device to the criteria, and scale the data collection and analysis based on the comparison. For example, the scaling profile manager 324 may determine whether the determined resources and capabilities of the device correspond to the triggers of the criteria for the sealing of the data collection and analysis In response to a determination that the determined resources and capabilities of the device correspond to the triggers, the data collection and analysis may be scaled based on the response associated with the triggers. Scaling of the data collection and analysis based on the response may include adjusting parameters of the data collection and analysis such that the parameters o correspond to the resources and capabilities of the device. For example, the scaling may include allocating additional resources and capabilities of the device to the data collection and analysis engine 308 or de-allocating at least one of the resources and capabilities of the device from the data collection and analysis engine 308. Scaling of the data collection and analysis based on the response may also include enabling or disabling features of the data collection and analysis engine 308, where the features may be enabled or disabled in response to the allocation or de-allocation of the resources of the device. Scaling of the data collection and analysis based on the response may further include adjusting one or more software limits of the data collection and analysis engine 308, where the software limits include a data grouping limit, an event queue size, and/or a data upload size.

In some embodiments, the scaling profile manager 324 may be configured to generate instructions 330 for the scaling of the data collection and analysis, and provide the instructions 330 to one or more resource allocators associated with the data collection and analysis engine 308. For example, a first resource allocator 332 may be associated with the data collector 310 of the data collection and analysis engine 308, and a second resource allocator 334 may be associated with the rule manager and analyzer 312 of the data collection and analysis engine 308. Upon receipt, the first resource allocator 332 and the second resource allocator 334 may be configured to execute the instructions 330 within respective components of the data collection and analysis engine 308 to scale the data collection and analysis performed by the data collection and analysis engine 308.

According to further embodiments, the rule manager and analyzer 312 of the data collection and analysis engine 308 may be configured to determine one or more additional data collection rules based on the scaled data collection and analysis. The additional data collection rules may indicate additional types of data to be collected, removal of types of data to be collected, aggregation, mathematical, and/or filtering operations to be performed on data to be collected, an increase or a decrease of the amount of data to be collected, an alternate time at which the data is to be collected, an increase or a decrease in the frequency at which the data is to be collected, and/or alternate operating conditions of the device 202 under which the data is to be collected. For example, if one or more resources have been allocated to the data collection and analysis engine 308 causing one or more features of the data collection engine to be enabled, the additional rules may increase a number of types of data, an amount of data, and/or a frequency at which the data is to be collected by the data collector 310 of the data collection and analysis engine 308. The rule manager and analyzer 312 may dynamically modify the data collection pattern received from the service provider based on the additional data collection rules determined, and provide the modified data collection pattern to the data collector 310. The data collector 310 may then be configured to perform data collection based on the modified data collection pattern.

In an example scenario, the device executing the application may be a smart phone that includes one core CPU and 512 megabytes (MB) of random-access memory (RAM). Initially, the data collection and analysis engine 308 of the telemetry module 306 may be allocated 10 MB of RAM for data collection and analysis in order to avoid performance impact. The data collection pattern comprising the data collection rules 316 received from the service provider may specify for the data collector 310 of the data collection and analysis engine 308 to collect metadata associated with the device. The profile 322 for the device received from the service provider may define criteria, including triggers and response(s) associated with the triggers, for scaling the data collection and analysis performed by the data collection and analysis engine 308. For example, the trigger of the criteria may include lithe device has greater than 600MB of RAM. The response associated with the trigger may include to allocate an additional 10% of available memory to the data collection and analysis engine 208. The scaling profile manager 324 may be provided resources and capabilities of the device form the resource monitor 326, compare the determined resources and capabilities of the device to the criteria, and scale the data collection and analysis based on the comparison. For example, the resources and capabilities of the device may correspond to the triggers of the criteria (that is, the device has greater than 600MB of RAM), and the data collection and analysis engine 208 may be allocated the additional 10% of memory for data collection and analysis by the first and second resource allocators 332 and 334. Accordingly, the data collection and analysis engine 308 may be able to collect more data, process more events, and perform more complex analysis on the device.

Following allocation, the rule manager and analyzer 312 of the data collection and analysis engine 308 may then be configured to determine one or more additional data collection rules based on the allocation. For example, an additional data collection rule may indicate to collect an increased amount of metadata associated with the device, as the amount of memory allocated to the data collection and analysis engine 308 by the first and second resource allocators 332 and 334 has increased enabling an increased amount of data to be collected and stored. Accordingly, the rule manager and analyzer 312 may dynamically modify the data collection pattern provided by the service provider with the additional data collection rule, and provide the modified data collection pattern to the data collector 310 of the data collection and analysis engine 308. The data collector 310 may then be configured to perform data collection based on the modified data collection pattern such that a greater amount of metadata of the device is collected to correspond to resources available to the collection and analysis engine 308 and ultimately the device.

The examples provided in FIGS. 1 through 3 are illustrated with specific services, applications, modules, module components, and configurations. Embodiments are not limited to environments according to these examples. Dynamic modification of a data collection pattern for a target device may be implemented in environments employing fewer or additional services, applications, modules, module components, and user experience configurations. Furthermore, the example services, applications, modules, module components, and configurations shown in FIG. 1 through 3 may be implemented in a similar manner with other values using the principles described herein.

Figure 4:
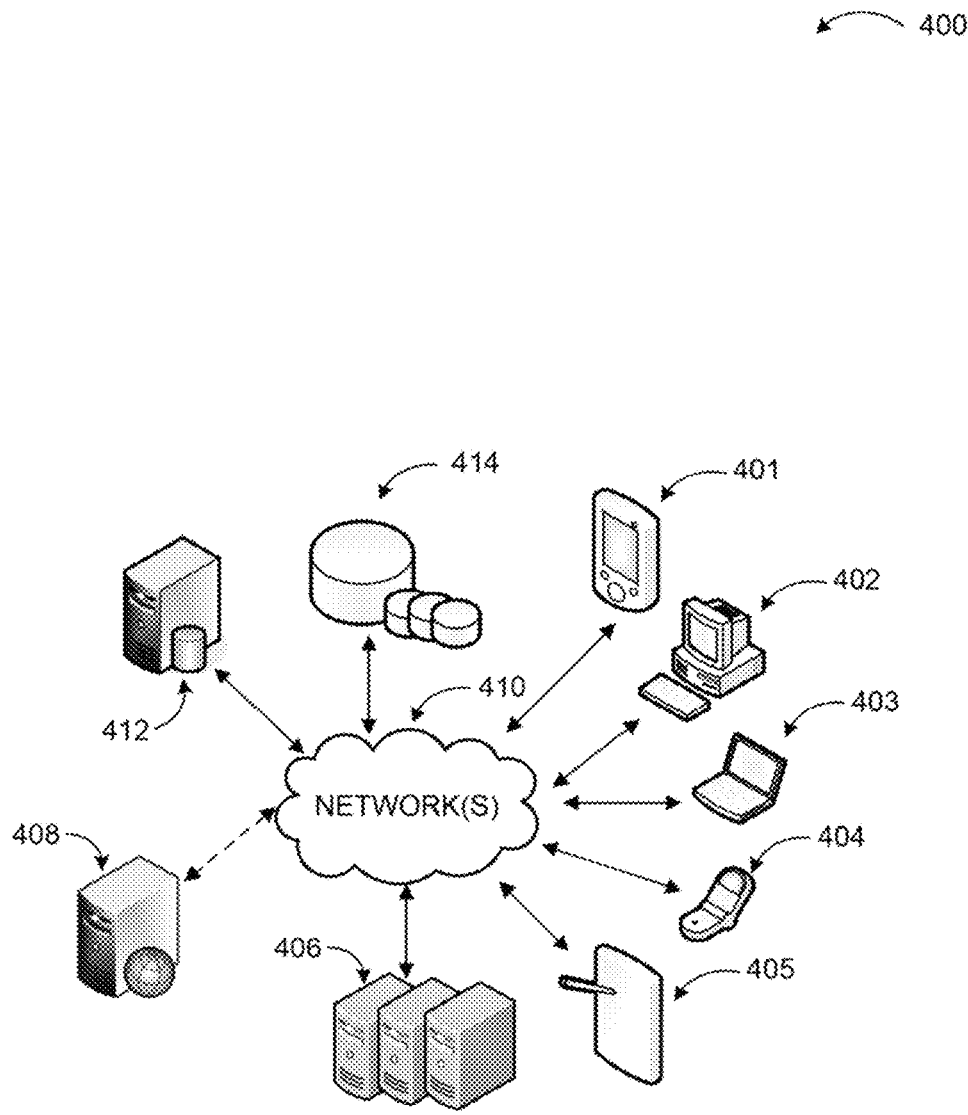
FIG. 4 is a networked environment, where a system according to embodiments may be implemented.

FIG. 4 is a networked environment, where a system according to embodiments may be implemented. in addition to locally installed applications, such as application 522 discussed below, a telemetry module may also be employed in conjunction with hosted applications and services that may be implemented via software executed over one or more servers 406 or individual server 408. A hosted service or application may communicate with client applications on individual computing devices such as a handheld computer 401, a desktop computer 402, a laptop computer 403, a smart phone 404, a tablet computer (or slate), 405 ('client devices') through network(s) 410 and control a user interface presented to users.

Client devices 401-405 are used to access the functionality provided by the hosted service or application. One or more of the servers 406 or server 408 may be used to provide a variety of services as discussed above. Relevant data may be stored in one or more data stores (e.g. data store 414), which may be managed by any one of the servers 406 or by database server 412.

Network(s) 410 may comprise any topology of servers, clients, Internet service providers, and communication media. A system according to embodiments may have a static or dynamic topology. Network(s) 410 may include a secure network such as an enterprise network, an unsecure network such as a wireless open network, or the Internet. Network(s) 410 may also coordinate communication over other networks such as PSTN or cellular networks. Network(s) 410 provides communication between the nodes described herein. By way of example, and not limitation, network(s) 410 may include wireless media such as acoustic, RF, infrared and other wireless media.

Many other configurations of computing devices, applications, data sources, and data distribution systems may be employed to provide a telemetry engine for data collection and analysis. Furthermore, the networked environments discussed in FIG. 4 are for illustration purposes only. Embodiments are not limited to the example applications, modules, or processes.

Figure 5:
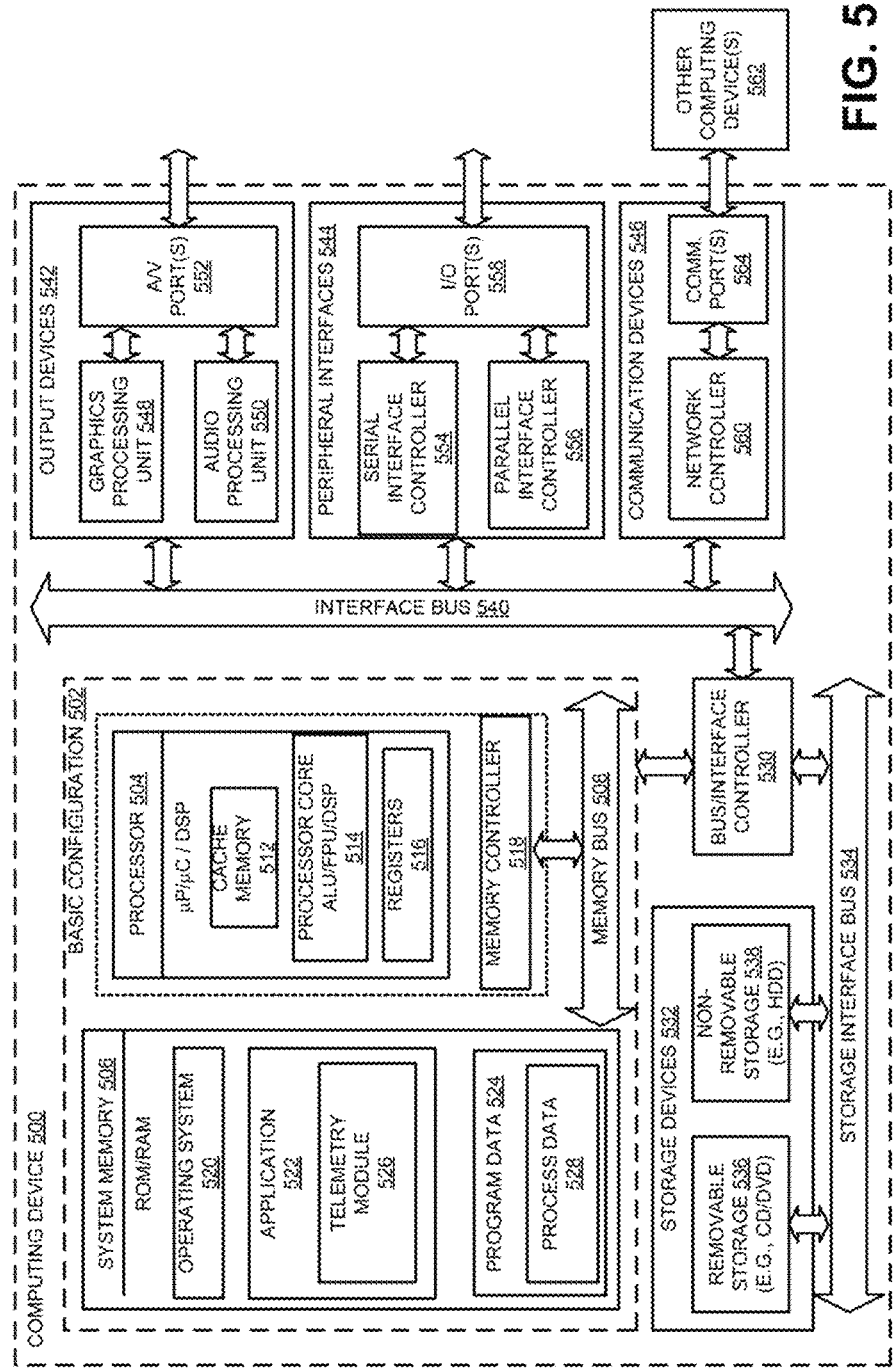
FIG. 5 is a block diagram of an example general purpose computing device, which may be used to dynamically modify a data collection pattern for a target device.

FIG. 5 is a block diagram of an example general purpose computing device, which may be used to dynamically modify a data collection pattern for a target device.

For example, computing device 500 may be used as a server, desktop computer, portable computer, smart phone, special purpose computer, or similar device. In an example basic configuration 502, the computing device 500 may include one or more processors 504 and a system memory 506. A memory bus 508 may be used fir communicating between the processor 504 and the system memory 506. The basic configuration 502 is illustrated in FIG. 5 by those components within the inner dashed line.

Depending on the desired configuration, the processor 504 may be of any type, including but not limited to a microprocessor (µP), a microcontroller (µC), a digital signal processor (DSP), or any combination thereof. The processor 504 may include one more levels of caching, such as a level cache memory 512, one or more processor cores 514, and registers 516. The example processor cores 514 may (each) include an arithmetic logic unit (ALU), a floating point unit (FPU), a digital signal processing core (DSP Core), or any combination thereof. An example memory controller 518 may also be used with the processor 504, or in some implementations the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, an application 522, and program data 524. The application 522 may include a telemetry module 526, which may be an integrated module of the application 522. In addition to facilitating data collection and analysis for reporting to a service associated with the application 522, and dynamic scaling of the data collection and analysis for the computing device 500, the telemetry module 526 may be configured to dynamically modify a data collection pattern for the computing device 500, as described herein. The telemetry module 526 may include specialized components, such as a scaling profile manager and a data collection and analysis engine, among other components. The scaling profile manager may be configured to receive a profile for the computing device 500 from the service, where the profile may define criteria for a scaling of the data collection and analysis performed by the data collection and analysis engine. The data collection and analysis may be performed based on a data collection pattern comprising one or more data collection rules provided by the service. The scaling profile manager may be configured to determine one or more resources and capabilities of the computing device 500, compare the determined resources and capabilities to the criteria, and scale the data collection and analysis based on the comparison. The data collection and analysis engine may then be configured to determine one or more additional data collection rules based on the scaled data collection and analysis, and dynamically modify the data collection pattern based on the additional data collection rules. The program data 524 may include, among other data, process data 528, such as telemetry data, as well as data associated with the profile and/or data collection rules, as described herein.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (for example, one or more output devices 542, one or more peripheral interfaces 544, and one or more communication devices 546) to the basic configuration 502 via the bus/interface controller 530. Some of the example output devices 542 include a graphics processing unit 548 and an audio processing unit 550, which may be configured to communicate to various external devices such as a display or speakers via one or more A/V ports 552. One or more example peripheral interfaces 544 may include a serial interface controller 554 or a parallel interface controller 556, which may be configured to communicate with external devices such as input devices (for example, keyboard, mouse, pen, voice input device, touch input device, etc.) or other peripheral devices (for example, printer, scanner, etc.) via one or more I/O ports 558. An example communication device 546 includes a network controller 560, which may be arranged to facilitate communications with one or more other computing devices 562 over a network communication link via one or more communication ports 564. The one or more other computing, devices 562 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Example embodiments may also include methods to dynamically modify data collection patterns for a target device. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 6:
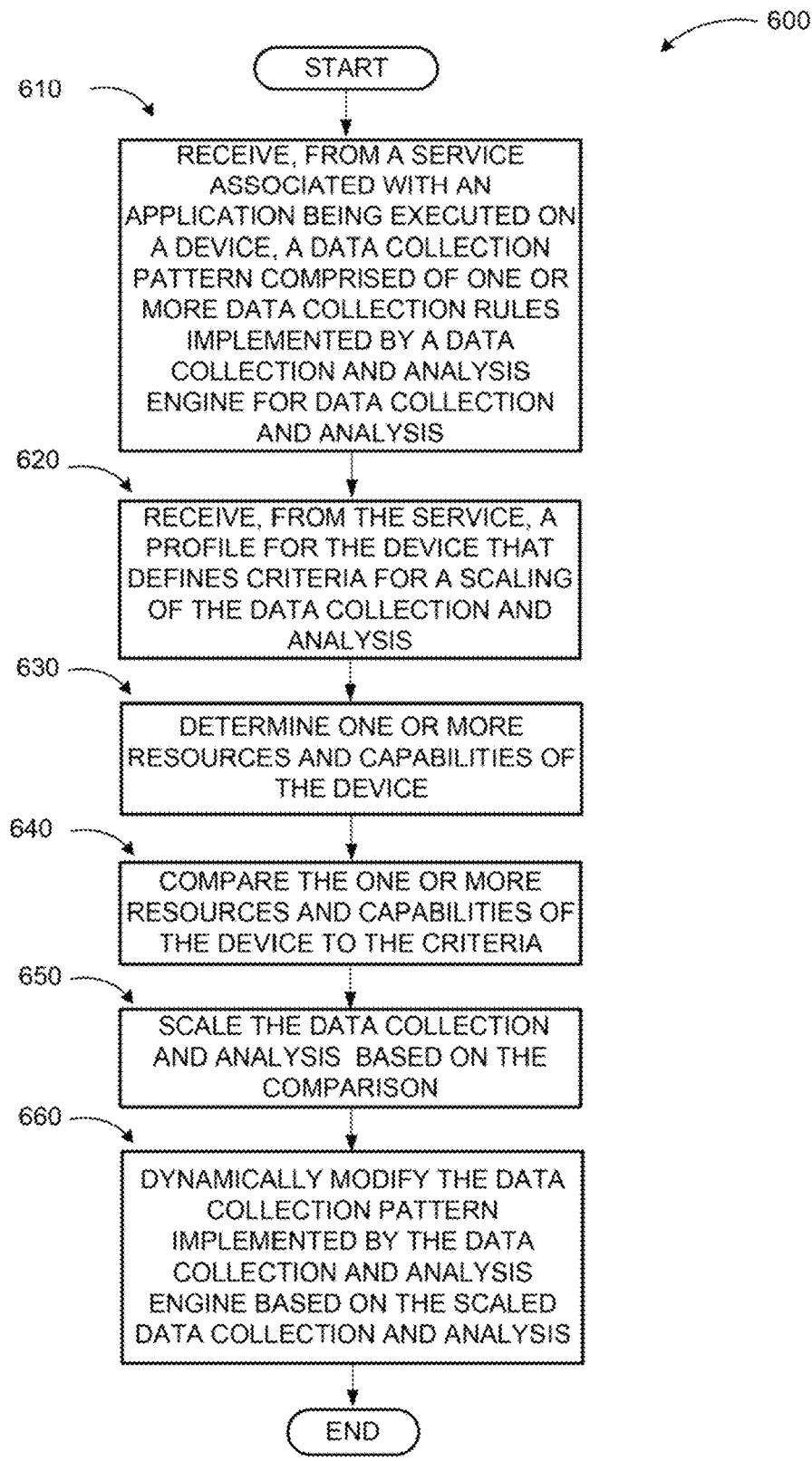
FIG. 6 illustrates a logic flow diagram of a method to dynamically modify a data collection pattern for a target device, according to embodiments.

FIG. 6 illustrates a logic flow diagram of a method to dynamically modify a data collection pattern for a target device, according to embodiments.

Process 600 may be implemented on a computing device, server, or other system. An example system may include an application installed on a device, where a telemetry module is integrated with the application. The telemetry module may include specialized components, such as a data collection and analysis engine, a scaling profile manager, and a telemetry transport component, among other components.

Process 600 begins with operation 610, where the telemetry module may receive a data collection pattern comprised of one or more data collection rules from a service that is associated with the application being executed on the device. For example, the data collection and analysis engine of the telemetry module may be configured to receive the data collection pattern from the service through the telemetry transport component. The data collection rules may indicate one or more types of data to be collected, types of operations to be performed on data to be collected, an amount of data to be collected, a time at which the data is to be collected, a frequency at which the data is to be collected, and/or operating conditions of the device wider which the data is to be collected, for example. The data collection and analysis engine may implement the data collection pattern to perform data collection and analysis for reporting to the service.

At operation 620, the telemetry module may receive a profile for the device from the service, where the profile may define criteria for a scaling of the data collection and analysis performed by the data collection and analysis engine. For example, the scaling profile manager of the telemetry module may be configured to receive the profile for the device from the service through the telemetry transport component. The criteria may include one or more triggers associated with resource events of the device, software events of the device, and/or user actions associated with the device. The criteria may also include a response for each of the triggers.

At operation 630, the scaling profile manager may be configured to determine one or more resources and capabilities of the device. The determined resources and capabilities of the device may include resources and capabilities associated with the triggers of the criteria. At operation 640, the scaling profile manager may be configured to compare the resources and capabilities of the device to the criteria. For example, the scaling profile manager may determine whether the determined resources and capabilities of the device correspond to the triggers of the criteria for the scaling of the data collection and analysis.

At operation 650, the scaling profile manager may be configured to scale the data collection and analysis based on the comparison. For example, in response to a determination that the determined resources and capabilities of the device correspond to the triggers, the data collection and analysis may be scaled based on the response associated with the triggers included within the criteria. The data collection and analysis may be scaled based on the response such that parameters of the data collection and analysis correspond to resources and capabilities of the device.

At operation 650, the data collection and analysis engine may be configured to modify the data collection pattern based on the scaled data collection and analysis. For example, a rule manager and analyzer component of the data collection and analysis engine may be configured to determine one or more additional data collection rules based on the scaled data collection and analysis. The additional data collection rules may indicate additional types of data to be collected, removal of types of data to be collected, aggregation, mathematical, and/or filtering types of operations to be performed on data to be collected, an increase or a decrease in an amount of data to be collected, an alternate time at which the data is to be collected, an increase or a decrease of the frequency at which the data is to be collected, and/or alternate operating conditions of the device under which the data is to be collected, for example. The rule manager and analyzer component of the data collection and analysis engine may then be configured to modify the data collection pattern based on the additional data collection rules determined, and provide the modified data collection pattern to a data collector of the data collection and analysis engine. The data collector may be configured to implement the modified data collection pattern to perform the data collection.

The operations included in process 600 are for illustration purposes. Dynamic scaling of data collection patterns may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to some embodiments, computing devices to dynamically modify a data collection pattern may be described. An example computing device may include a memory configured to store instructions, and one or more processors coupled to the memory and configured to execute, in conjunction with the instructions stored in the memory, an application and a telemetry module integrated with the application. The telemetry module may include a data collection and analysis engine configured to receive the data collection pattern comprised of one or more data collection rules from a service associated with the application, and perform data collection and analysis for reporting to the service based on the data collection pattern. The telemetry module may also include a scaling profile manager configured to receive a profile for the device that defines criteria for scaling of the data collection and analysis from the service, determine one or more resources and capabilities of the device, and compare the resources and capabilities of the device to the criteria in order to generate instructions for scaling the data collection and analysis based On the comparison. The telemetry module may also include one or more resource allocators associated with the data collection and analysis engine configured to receive and execute the instructions generated by the scaling profile manager to scale the data collection and analysis, where the data collection and analysis engine is further configured to determine one or more additional data collection rules based on the scaled data collection and analysis, and dynamically modify the data collection and pattern based on the additional data collection rules.

In other embodiments, the data collection rules may indicate types of data to be collected, types of operations to be performed on data to be collected, an amount of data to be collected, a time at which data is to be collected, a frequency at which data is to be collected, and/or operating conditions of the computing device under which data is to be collected. The additional data collection rules may indicate additional types of data to be collected, removal of the types of data to be collected, aggregation, mathematical, and/or filtering operations to be performed on data to be collected, an increase in the amount of data to be collected, a decrease in the amount of data to be collected, an alternate time at. which the data is to be collected, an increase of the frequency at which the data is to be collected, a decrease of the frequency at which the data is to be collected, and/or alternate operating conditions of the computing device under which the data is to be collected.

In further embodiments, the data collection and analysis engine may include a data collector component and a rule manager and analyzer component, where the rule manager and analyzer component may be configured to determine the additional data collection rules based on the scaled data collection and analysis, and dynamically modify the data collection and pattern based on the additional data collection rules. The data collector component may be configured to receive the dynamically modified data collection from the rule manager and analyzer component, and implement the modified data collection pattern for data collection. The telemetry module may further include a telemetry transport component configured to receive the data collection pattern and the profile from a server executing the service, and provide the data collection pattern and the profile to the data collection and analysis engine and the scaling profile manager, respectively. The telemetry module may further include a resource monitor configured to monitor the resources and capabilities of the computing device in real-time, and provide the resources and capabilities of the computing device to the scaling profile manager for the comparison.

In yet further embodiments, the criteria for the scaling of the data collection and analysis may include one or more triggers and a response associated with the triggers. The triggers may be associated with resource events of the computing device, software events of the computing device, and/or user actions associated with the computing device. The resources and capabilities of the computing device determined may be associated with the triggers of the criteria, and include a computer processing unit (CPU) load percentage, an available memory, an available network, an available disk space, an available network bandwidth, and/or an available battery percentage.

According to some examples, methods executed at least in part in a computing device to dynamically modify a data collection pattern may be provided. An example method may include receiving, from a service associated with an application being executed on the computing device, the data collection pattern comprised of one or more data collection rules implemented by a data collection and analysis engine for data collection and analysis. The one or more data collection rules may indicate a type of data to be collected, types of operations to be performed on data to be collected, an amount of data to be collected, a time at which data is to be collected, a frequency at which data is to be collected, and/or operating conditions of the computing device under which data is to be collected. The example method may also include receiving, from the service, a profile for the computing device that defines criteria for scaling of the data collection and analysis, determining one or more resources and capabilities of the computing device, comparing the resources and capabilities of the computing device to the criteria, and scaling the data collection and analysis based on the comparison. The example method may further include dynamically modifying the data collection pattern implemented by the data collection and analysis engine based on the scaled data collection and analysis.

In other examples, dynamically modifying the data collection pattern implemented by the data collection and analysis engine may include determining one or more additional data collection rules based on the scaled data collection and analysis, and dynamically modifying the data collection pattern based on the additional data collection rules. The additional data collection rules may indicate additional types of data to be collected, removal of the types of data to be collected, at least one of aggregation, mathematical, and filtering operations to be performed on data to be collected, an increase in the amount of data to be collected, a decrease in the amount of data to be collected, an alternate time at which the data is to be collected, an increase of the frequency at which the data is to be collected, a decrease of the frequency at which the data is to be collected, and/or alternate operating conditions under which the data is to be collected.

In further examples, scaling the data collection and analysis based on the comparison may include adjusting, parameters of the data collection and analysis such that the parameters correspond to the resources and capabilities of the computing device. Dynamically modifying the data collection pattern implemented by the data collection and analysis engine based on the scaled data collection and analysis may include dynamically modifying the data collection pattern such that the data collection pattern also corresponds to the resources and capabilities of the computing device. Comparing the resources and capabilities of the computing. device to the criteria may include determining whether the resources and capabilities of the computing device includes one or more triggers included within the criteria for the scaling of the data collection and analysis, and scaling the data collection and analysis based on the comparison may include scaling the data collection and analysis engine according to a response for the triggers included within the criteria for the scaling of the data collection and analysis in response to a determination that the resources and capabilities of the computing device include the triggers.

According to some embodiments, computer readable memory devices with instructions stored thereon to dynamically modify a data collection pattern may be described. Example instructions may include receiving, from a service associated with an application being executed on the device, the data collection pattern comprised of one or more data collection rules implemented by a data collection and analysis engine for data collection and analysis, and receiving, from the service, a profile for the computing device that defines criteria for scaling of the data collection and analysis. The example instructions may also include determining one or more resources and capabilities of the device, comparing the resources and capabilities of the device to the criteria, and scaling the data collection and analysis based on the comparison by adjusting parameters of the data collection and analysis such that the parameters correspond to the resources and capabilities of the device. The example instructions may further include determining one or more additional data collection rules based on the scaled data collection and analysis, and dynamically modifying the data collection pattern implemented by the data collection and analysis engine based on the additional data collection rules such that the data collection pattern also corresponds to the resources and capabilities of the computing device.

In other embodiments, the data collection pattern may be received from a server executing the service through a telemetry transport component. The profile may also be received from the server executing the service through the telemetry transport component The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computing device to dynamically modify a data collection pattern, the computing device comprising:
a memory configured to store instructions; and
one or more processors coupled to the memory, the one or more processors configured to execute, in conjunction with the instructions stored in the memory, an application and a telemetry module integrated with the application, wherein the telemetry module comprises:
a data collection and analysis engine configured to:
receive the data collection pattern comprised of one or more data collection rules from a service associated with the application; and
perform data collection and analysis for reporting to the service based on the data collection pattern;
a scaling profile manager configured to:
receive a profile for the device that defines criteria for scaling of the data collection and analysis from the service;
determine one or more resources and capabilities of the device; and
compare the one or more resources and capabilities of the device to the criteria in order to generate instructions for scaling the data collection and analysis based on the comparison; and
one or more resource allocators associated with the data collection and analysis engine, the one or more resource allocators configured to receive and execute the instructions generated by the scaling profile manager to scale the data collection and analysis, wherein the data collection and analysis engine is further configured to
determine one or more additional data collection rules based on the scaled data collection and analysis,
dynamically modify the data collection pattern based on the one or more additional data collection rules such that the modified data collection pattern corresponds to the one or more resources and capabilities of the device, and
perform the data collection and analysis for reporting to the service based on the modified data collection pattern that corresponds to the one or more resources and capabilities of the device.

2. The computing device of claim 1, wherein the one or more data collection rules indicate one or more of: types of data to be collected, types of operations to be performed on data to be collected, an amount of data to be collected, a time at which data is to be collected, a frequency at which data is to be collected, and operating conditions of the computing device under which data is to be collected.

3. The computing device of claim 2, wherein the one or more additional data collection rules indicate one or more of: additional types of data to be collected, removal of the types of data to be collected, at least one of aggregation, mathematical, and filtering operations to be performed on data to be collected, an increase in the amount of data to be collected, a decrease in the amount of data to be collected, an alternate time at which the data is to be collected, an increase of the frequency at which the data is to be collected, a decrease of the frequency at which the data is to be collected, and alternate operating conditions of the computing device under which the data is to be collected.

4. The computing device of claim 1, wherein the data collection and analysis engine comprises a data collector component and a rule manager and analyzer component.

5. The computing device of claim 4, wherein the rule manager and analyzer component is configured to determine the one or more additional data collection rules based on the scaled data collection and analysis, and dynamically modify the data and collection pattern based on the one or more additional data collection rules.

6. The computing device of claim 4, wherein the data collector component is configured to receive the dynamically modified data collection from the rule manager and analyzer component, and implement the modified data collection pattern for data collection.

7. The computing device of claim 1, wherein the telemetry module further comprises:
a telemetry transport component configured to receive the data collection pattern and the profile from a server executing the service, and provide the data collection pattern and the profile to the data collection and analysis engine and the scaling profile manager, respectively.

8. The computing device of claim 1, wherein the telemetry module further comprises:
a resource monitor configured to monitor the one or more resources and capabilities of the computing device in real-time, and provide the one or more resources and capabilities of the computing device to the scaling profile manager for the comparison.

9. The computing device of claim 1, wherein the criteria for the scaling of the data collection and analysis includes one or more triggers and a response associated with the one or more triggers, and wherein the one or more triggers are associated with one or more of resource events of the computing device, software events of the computing device, and user actions associated with the computing device.

10. The computing device of claim 9, wherein the one or more resources and capabilities of the computing device determined are associated with the one or more triggers of the criteria, and include one or more of a computer processing unit (CPU) load percentage, an available memory, an available network, an available disk space, an available network bandwidth, and an available battery percentage.

11. A method executed at least in part in a computing device to dynamically modify a data collection pattern, the method comprising:
receiving, from a service associated with an application being executed on the computing device, the data collection pattern comprised of one or more data collection rules implemented by a data collection and analysis engine for data collection and analysis, wherein the one or more data collection rules indicate one or more of: a type of data to be collected, types of operations to be performed on data to be collected, an amount of data to be collected, a time at which data is to be collected, a frequency at which data is to be collected, and operating conditions of the computing device under which data is to be collected;

receiving, from the service, a profile for the computing device that defines criteria for scaling of the data collection and analysis;

determining one or more resources and capabilities of the computing device;

comparing the one or more resources and capabilities of the computing device to the criteria;

scaling the data collection and analysis based on the comparison;

determining one or more additional data collection rules based on the scaled data collection and analysis;

dynamically modifying the data collection pattern implemented by the data collection and analysis engine based on the one or more additional data collection rules such that the modified data collection pattern corresponds to the one or more resources and capabilities of the computing device; and performing, by the data collection and analysis engine, data collection and analysis using the modified data collection pattern.

12. The method of claim 11, wherein the one or more additional data collection rules indicate one or more of: additional types of data to be collected, removal of the types of data to be collected, at least one of aggregation, mathematical, and filtering operations to be performed on data to be collected, an increase in the amount of data to be collected, a decrease in the amount of data to be collected, an alternate time at which the data is to be collected, an increase of the frequency at which the data is to be collected, a decrease of the frequency at which the data is to be collected, and alternate operating conditions under which the data is to be collected.

13. The method of claim 11, wherein scaling the data collection and analysis based on the comparison comprises:
adjusting parameters of the data collection and analysis such that the parameters correspond to the one or more resources and capabilities of the computing device.

14. The method of claim 11, wherein comparing the one or more resources and capabilities of the computing device to the criteria comprises:
determining whether the one or more resources and capabilities of the computing device includes one or more triggers included within the criteria for the scaling of the data collection and analysis.

15. The method of claim 14, wherein scaling the data collection and analysis based on the comparison comprises:
in response to a determination that the one or more resources and capabilities of the computing device include the one or more triggers, scaling the data collection and analysis according to a response for the one or more triggers included within the criteria for the scaling of the data collection and analysis.

16. A method of dynamically modifying a data collection pattern, the method comprising:
receiving, from a service associated with an application being executed on a device, the data collection pattern comprised of one or more data collection rules implemented by a data collection and analysis engine for data collection and analysis;

receiving, from the service, a profile for the computing device that defines criteria for scaling of the data collection and analysis;

determining one or more resources and capabilities of the device;

comparing the one or more resources and capabilities of the device to the criteria;

scaling the data collection and analysis based on the comparison by adjusting parameters of the data collection and analysis such that the parameters correspond to the one or more resources and capabilities of the device;

determining one or more additional data collection rules based on the scaled data collection and analysis;

dynamically modifying the data collection pattern implemented by the data collection and analysis engine based on the one or more additional data collection rules such that the modified data collection pattern also corresponds to the one or more resources and capabilities of the computing device, and performing, by the data collection and analysis engine, data collection and analysis using the modified data collection pattern that corresponds to the one or more resources and capabilities of the computing device.

17. The method of claim 16, further comprising:
receiving the data collection pattern from a server executing the service through a telemetry transport component.

18. The method of claim 17, further comprising:
receiving the profile from the server executing the service through the telemetry transport component.

19. The method of claim 16, wherein comparing the one or more resources and capabilities of the device to the criteria comprises:
determining whether the one or more resources and capabilities of the computing device includes one or more triggers included within the criteria for the scaling of the data collection and analysis.

20. The method of claim 19, wherein scaling the data collection and analysis based on the comparison by adjusting parameters of the data collection and analysis comprises:
in response to a determination that the one or more resources and capabilities of the computing device include the one or more triggers, scaling the data collection and analysis according to a response for the one or more triggers included within the criteria for the scaling of the data collection and analysis.

* * * * *